United States Patent
Li et al.

(10) Patent No.: US 12,022,002 B2
(45) Date of Patent: Jun. 25, 2024

(54) APPARATUS, METHODS, AND PROGRAM PRODUCTS FOR GENERATING SECURE SHORT UNIVERSAL RESOURCE LOCATORS

(71) Applicant: Lenovo (Singapore) Pte. Ltd., New Tech Park (SG)

(72) Inventors: Scott Li, Cary, NC (US); Igor Stolbikov, Apex, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 289 days.

(21) Appl. No.: 17/576,740

(22) Filed: Jan. 14, 2022

(65) Prior Publication Data

US 2023/0231722 A1    Jul. 20, 2023

(51) Int. Cl.
  *H04L 9/32*    (2006.01)
(52) U.S. Cl.
  CPC .......... *H04L 9/3247* (2013.01); *H04L 9/3263* (2013.01)
(58) Field of Classification Search
  CPC .......................... H04L 9/3247; H04L 9/3263
  See application file for complete search history.

(56) References Cited

U.S. PATENT DOCUMENTS

| | | | | |
|---|---|---|---|---|
| 11,095,620 | B1* | 8/2021 | Sirota | H04L 63/062 |
| 2007/0033642 | A1* | 2/2007 | Ganesan | H04L 63/1441 |
| | | | | 726/10 |
| 2016/0323107 | A1* | 11/2016 | Bhogal | H04W 12/10 |
| 2016/0323108 | A1* | 11/2016 | Bhogal | H04W 12/08 |
| 2019/0068560 | A1* | 2/2019 | Roth | H04L 63/102 |
| 2021/0203486 | A1* | 7/2021 | Kilburn | H04L 9/0877 |

FOREIGN PATENT DOCUMENTS

| | | | | |
|---|---|---|---|---|
| CN | 102946404 | A * | 2/2013 | |
| WO | WO-2021030545 | A1 * | 2/2021 | H04L 63/0807 |
| WO | WO-2021097328 | A1 * | 5/2021 | G06Q 30/0241 |

OTHER PUBLICATIONS

Selvi et al.; "Splitting and Aggregating Signatures in Cryptocurrency Protocols"; 2019; IEEE Computer Society; pp. 100-108. (Year: 2019).*

* cited by examiner

*Primary Examiner* — Richard G Keehn
(74) *Attorney, Agent, or Firm* — Kunzler Bean & Adamson

(57) ABSTRACT

Apparatus, methods, and computer program products for managing power sharing in electronic devices are disclosed. One apparatus includes a processor and a memory that stores code executable by the processor to determine, in real-time, whether one or more first electronic devices that are compatible with a second electronic device that is low on power are within a predetermined geographic distance of the second electronic device and, in response to determining that one or more first electronic devices that are compatible with the second electronic device are within the predetermined geographic distance of the second electronic device, transmit a request to the one or more first electronic devices inquiring whether any of the one or more first electronic devices are willing to share power with the second electronic device. Methods and computer program products that include and/or perform the operations of the apparatus are also disclosed.

20 Claims, 12 Drawing Sheets

APPARATUS, METHODS, AND PROGRAM PRODUCTS FOR GENERATING SECURE SHORT UNIVERSAL RESOURCE LOCATORS

FIELD

The subject matter disclosed herein relates to electronic systems and more particularly relates to apparatus, methods, and program products that can generate secure shortened Universal Resource Locators.

DESCRIPTION OF THE RELATED ART

Contemporary Universal Resource Locator (URL) shortening techniques pose security issues because a user does not know the exact destination of a shortened URL. In other words, shortened URLs are convenient for attackers to hide the actual destination of a shortened URL or initiate the download of malicious software (e.g., malware, ransomware, spyware, adware, worms, trojan horses, key loggers, etc.) to a computing device. Currently, users are forced to rely on the provider of a short URL to provide security measures when generating a shortened URL, which can lead to trust issues from the user's point of view.

BRIEF SUMMARY

Apparatus, methods, and computer program products for generating secure shortened Universal Resource Locators are disclosed. One apparatus includes a processor and a memory that stores code executable by the processor. The executable code causes the processor to shorten a Universal Resource Locator (URL) for a web site, sign the shortened URL via a private key to generate a signature for the shortened URL, and combine the shortened URL with a split signature of the signature to generate a secure short URL for the website.

Also disclosed are methods for generating secure shortened Universal Resource Locators. One method includes shortening, by a processor, a URL for a website, signing the shortened URL via a private key to generate a signature for the shortened URL, and combining the shortened URL with a split signature of the signature to generate a secure short URL for the website.

Computer program products including a computer-readable storage medium including code embodied therewith are further disclosed herein. The code is executable by a processor and causes the processor to shorten a URL for a website, sign the shortened URL via a private key to generate a signature for the shortened URL, and combine the shortened URL with a split signature of the signature to generate a secure short URL for the website.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
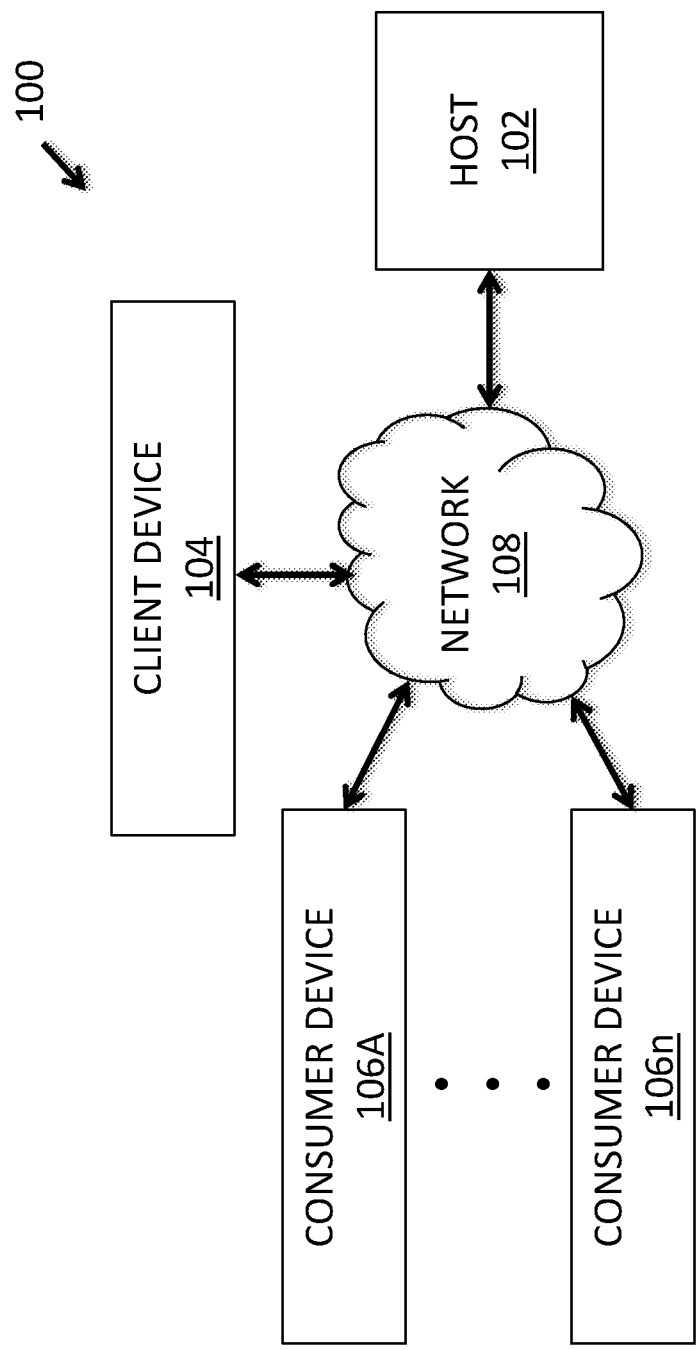
FIG. 1 is a schematic block diagram of one embodiment of a computing system that can generate secure Universal Resource Locators (URLs)

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include a computer-readable storage medium or a plurality of computer-readable storage media. A computer-readable storage medium may include a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide apparatus, methods, and computer program products that can generate secure shortened Universal Resource Locators are disclosed. One apparatus includes a processor and a memory that stores code executable by the processor. The executable code causes the processor to shorten a Universal Resource Locator (URL) for a website, sign the shortened URL via a private key to generate a signature for the shortened URL, and combine the shortened URL with a split signature of the signature to generate a secure short URL for the web site.

Also disclosed are methods for generating secure shortened Universal Resource Locators. One method includes shortening, by a processor, a URL for a website, signing the shortened URL via a private key to generate a signature for the shortened URL, and combining the shortened URL with a split signature of the signature to generate a secure short URL for the website.

Computer program products including a computer-readable storage medium including code embodied therewith are further disclosed herein. The code is executable by a processor and causes the processor to shorten a URL for a website, sign the shortened URL via a private key to generate a signature for the shortened URL, and combine the shortened URL with a split signature of the signature to generate a secure short URL for the website.

Turning now to the drawings, FIG. 1 is schematic block diagram illustrating one embodiment of a system 100 that can generate secure shortened URLs. At least in the illustrated embodiment, a system 100 includes, among other components, a host computing device 102 (or host 102), a client computing device 104 (or client device 104), and one or more consumer computing devices 106A through 106n (also simply referred to herein as, consumer device(s) 106) coupled to and/or in communication with each other via a network 108.

A host 102 may include any suitable electronic system, set of electronic devices, software, and/or set of applications capable of performing the operations and/or functions disclosed herein. In various embodiments, the host 102 is configured to generate secure shortened URLs.

Figure 2A:
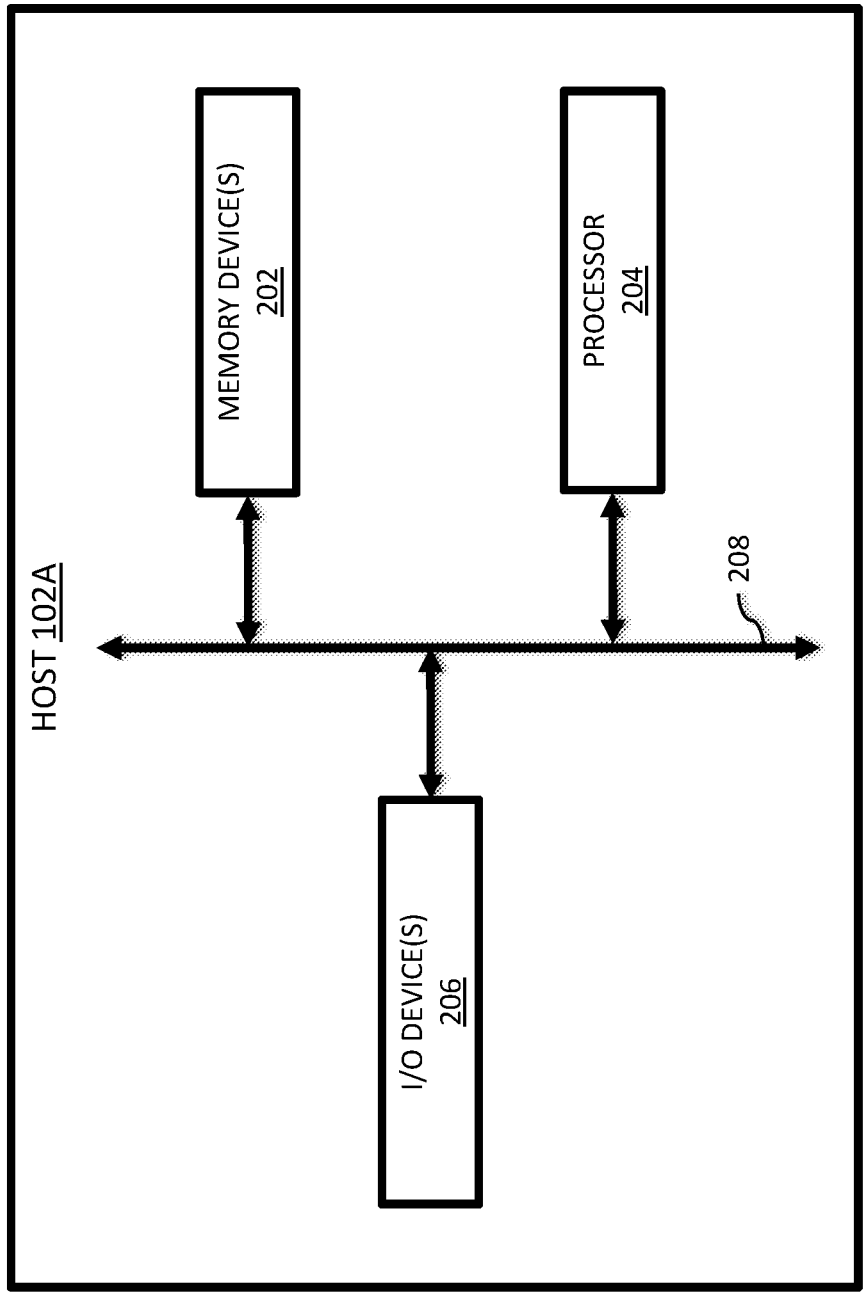
FIGS. 2A and 2B are schematic block diagrams of various embodiments of host computing device included in the computing system of FIG. 1.

With reference to FIG. 2A, FIG. 2A is a block diagram of one embodiment of a host 102A. At least in the illustrated embodiment, the host 102A includes, among other components, one or more memory devices 202, a processor 204, and one or more input/output (I/O) devices 206 coupled to and/or in communication with one another via a bus 208 (e.g., a wired and/or wireless bus).

A set of memory devices 202 may include any suitable quantity of memory devices 202. Further, a memory device 202 may include any suitable type of device and/or system that is known or developed in the future that can store computer-useable and/or computer-readable code. In various embodiments, a memory device 202 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A memory device 202, in some embodiments, includes volatile computer-readable storage media. For example, a memory device 202 may include random-access memory (RAM), including dynamic RAM (DRAM), synchronous dynamic RAM (SDRAM), and/or static RAM (SRAM). In other embodiments, a memory device 202 may include non-volatile computer-readable storage media. For example, a memory device 202 may include a hard disk drive, a flash memory, and/or any other suitable non-volatile computer storage device that is known or developed in the future. In various embodiments, a memory device 202 includes both volatile and non-volatile computer-readable storage media.

Figure 3A:
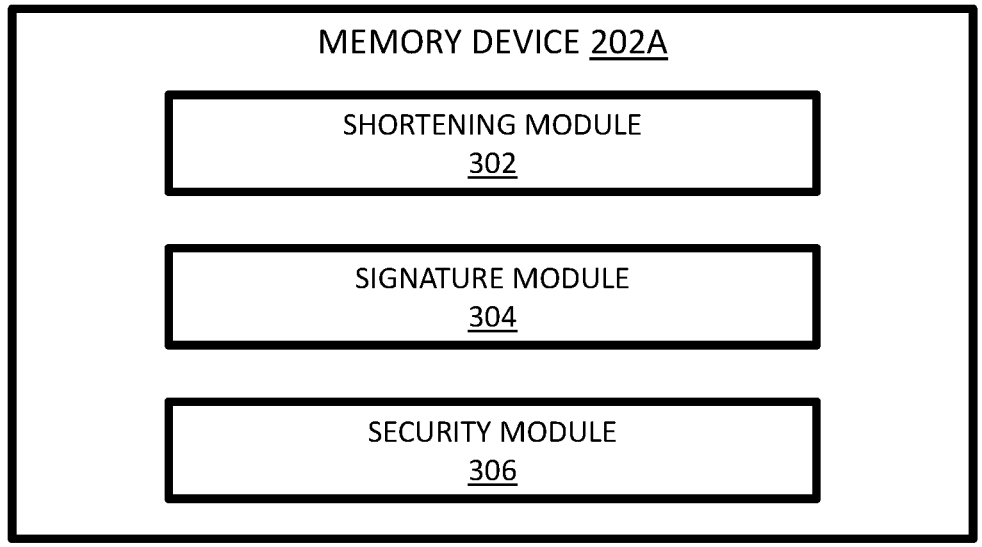
FIGS. 3A and 3B are schematic block diagrams of various embodiments of a memory device included in the host computing devices of FIGS. 2A and 2B.

With reference now to FIG. 3A, FIG. 3A is a schematic block diagram of one embodiment of a memory device 202A. At least in the illustrated embodiment, the memory device 202A includes, among other components, a shortening module 302, a signature module 304, and a security module 306 that are each configured to cooperatively operate/function with one another when executed by the processor 204 to generate secure shortened URLs.

A shortening module 302 may include any suitable hardware and/or software that can shorten the length of a URL. In various embodiments, a shortening module 302 is configured to receive a full-length URL from, for example, a client device 104, which URL may include any suitable length and/or quantity of characters (e.g., alphanumeric numeric characters, special characters, etc.), as at least a portion of a request to generate a secure short URL. Further, the shortening module 302 is configured to initiate a process to generate a secure short URL in response to receiving the request.

In various embodiments, the shortening module 302 is further configured to shorten and/or reduce the quantity of characters in the full-length URL to generate a shortened URL. The shortened URL may be generated (e.g., reduced) using any suitable technique, method, and/or process that is capable of shortening and/or reducing the quantity of characters in a full-length URL.

Further, the shortened URL may include any suitable quantity of characters. In various embodiments, the shortened URL includes an identifier of the host 102 and/or entity that owns/controls the host 102, as discussed in greater detail below. In additional or alternative embodiments, the shortened URL identifies a destination (e.g., an address) of the shortened URL and/or full-length URL, as further discussed in greater detail below.

An example of a full-length URL may include, but is not limited to:
 https://www.lenovo.com/data=04%7C01%7Cistolbi
  kov%40lenovo.com%7Cb22efb330f08469debf908d
  96d7b3ba4%7C5c7d0b28bdf8410caa934df372b162
  03%7C1%7C0%7C637661198328480152%7CUnk
  nown%7CTWFpbGZsb3d8eyJWIjoiMC4wLjAwM
  DAiLCJQIjoiV2luMzELCJBTiI6IklhaWwiLCJXV
  CI6Mn0%3D%7C1000& sdata=MNG%2F%2

BqTHtK3Zxgrg%2F9hP%2FRvw7tuluwRXyCrMz
uX6bhM%3D&reserved=0,
among other full-length URLs that are possible and contemplated herein. In this example, a lenovo.com webpage on the Lenovo website is the destination of the full-length URL. Further, supposing that an entity with an identifier, "secure.ly," is the entity that is providing a secure short URL, a non-limiting example of a shortened URL for this example full-length URL may include, secure.ly/lenovo/ . . . , in which "secure.ly" is the identifier of the host 102 and/or entity that owns/controls the host 102 and "lenovo" identifies the account holder/owner of the account (e.g., a provider verified by secure.ly (e.g., a verified provider)) that requested the secure short URL (e.g., client device 104), among other examples that are possible and contemplated herein.

The shortening module 302 is configured to associate the full-length URL and the shortened URL so that, upon actuation, a user can be redirected to the destination website/webpage. In other words, the full-length URL and the shortened URL are associated with one another for look-up and/or reference purposes.

In various embodiments, the shortening module 302 is configured to transmit the shortened URL to a signature module 304. Further, the signature module 304 is configured to receive the shortened URL from the shortening module 302.

A signature module 304 may include any suitable hardware and/or software that can sign, provide a signature to, and/or encrypt a shortened URL. In various embodiments, the signature module 304 is configured to sign, provide a signature to, and/or encrypt a shortened URL using an encryption protocol.

A shortened URL can be signed, provided with a signature, and/or encrypted using any suitable encryption protocol that is known or developed in the future. In various embodiments, the shortened URL is signed, provided with a signature, and/or encrypted using an encryption protocol that includes a pair of private/public encryption keys, which can be any suitable encryption protocol using a pair of private/public encryption keys. Non-limiting examples of encryption protocols that use a pair of private/public encryption keys can include, but are not limited to, a Public Key Infrastructure (PKI) encryption protocol, a Rivest-Shamir-Adleman (RSA) encryption protocol, a Digital Signature Algorithm (DSA) encryption protocol, and an Elliptic Curve Digital Signature Algorithm (ECDSA) encryption protocol, among other encryption protocols that are possible and contemplated herein.

In various embodiments, the shortened URL is signed and/or encrypted via a private encryption key. An example of a signature based on a private encryption key may include, but is not limited to, the following signature:

LyXKLdrP9u9oKw+VDhUhgaiMNj uahrkNY+rrcIk4ztGK
tHR0rvEZ0XOBaka6zfP8nTm87jYGpFhnUFd8Z8a7j+p7b
RI9IY22cuXF5pbLaN9OOYeLai0LwpeAQvTQ7c7EVUz7xg7oIGMTvJvZnnvw+
nhOe44ACFVvgFzYP8oenTk=, among other signatures that are possible and contemplated herein. In this non-limiting example, the resulting signed shortened URL is, for example:

secure.ly/lenovo/LyXKLdrP9u9oKw+VDhUhgaiMN-juahrk NY+
rrcIk4ztGKtHR0rvEZ0XOBaka6zfP8nTm87jYGpFhn UFd8Z8a7j+
p7bRI9IY22cuXF5pbLaN9OOYeLai0LwpeA
QvTQ7c7EVUz7xg7oIGMTvJvZnnvw+
nhOe44ACFVvgF zYP8oenTk=.

While the above examples provide specific details, the various embodiments disclosed herein are not limited to these examples. That is, these examples are provided to assist in understanding the various embodiments disclosed herein and are not intended to limit the spirit and/or scope of the various embodiments in any manner. Accordingly, one skilled in the art will recognize that there are an infinite quantity of possible examples of the various embodiments, each of which is contemplated herein.

In various embodiments, the signature module 304 is configured to transmit the signed shortened URL to a security module 306. Further, the security module 306 is configured to receive the signed shortened URL from the signature module 304.

A security module 306 may include any suitable hardware and/or software that can generate a secure short URL. In various embodiments, the secure short URL generated by a security module 306 is based on the signed shortened URL generated by the shortening module 302 and the signature module 304.

A secure short URL may include any suitable quantity of characters. In various embodiments, a secure short URL includes the identifier of the entity that generated the secure short URL, a destination identifier, and a set of characters of the signature.

The set of characters of the signature included in the secure short URL may include any quantity of characters that is greater than or equal to one (1) and at least one less character than the entirety of the signature such that the secure short URL includes less signature characters than the full signature. In certain embodiments, the signature included in the secure short URL includes eight (8) characters, among other quantities of characters that are possible and contemplated herein. In other embodiments, the signature included in the secure short URL can include one character, two (2) characters, three (3) characters, four (4) characters, five (5) characters, six (6) characters, seven (7) characters, nine (9) characters, or ten (10) characters, among other quantities of characters that are possible and contemplated herein. In still other embodiments, the signature included in the secure short URL can include greater than 10 characters.

In a further non-limiting example of the above examples in which the signature included in the secure short URL includes 8 characters, a secure short URL may include, "secure.ly/lenovo/LyXKLdrP." In this example secure short URL, "secure.ly" is the identifier of the host 102 and/or entity that owns/controls the host 102, "lenovo" identifies the account holder (e.g., a verified provider), and "LyXKLdrP" are the first 8 characters of the signature.

While this example uses the first 8 characters of the signature, various other examples can utilize any string of 8 consecutive characters in the signature. That is, various embodiments of the security module 306 are configured to utilize any string of consecutive characters in the signature in generating the secure short URL. In other words, the characters in the signature may include any quantity of consecutive characters at any position/location in the signature.

In certain embodiments, the secure short URL generated by the security module 306 can further include a date stamp. In additional or alternative embodiments, the secure short URL generated by the security module 306 can further include a time stamp.

In some embodiments, the security module 306 is configured to add padding data to the secure short URL. That is, the security module 306 is configured to compare the characters used in the signature (e.g., "LyXKLdrP") of a currently generated secure short URL to previously generated secure short URLs to determine if there is a match. In response to the currently generated secure short URL matching one or more previously generated secure short URLs, the security module 306 is configured to add padding data to the signature (but not to the currently generated secure short URL) from which the currently generated secure short URL is generated and/or corresponds to so that the currently generated secure short URL is distinguished from the previously generated secure short URL(s). In response to the currently generated secure short URL not matching one or more previously generated secure short URLs, padding data is not added to the signature.

The padding data may be any suitable type of data capable of padding a signature to distinguish the currently generated secure short URL from a previously generated secure short URL. Further, the amount of data used to pad a signature may include any suitable amount of data that can distinguish the currently generated secure short URL from a previously generated secure short URL.

In various embodiments, the amount of padding data added to a signature includes at least 32 bytes of data. In certain embodiments, the amount of padding data added to a signature includes 32 bytes of data, 64, bytes of data, 128 bytes of data, 256 bytes of data, 512 bytes of data, and any other quantity of data greater than 512 bytes of data that are possible, each of which is contemplated herein.

The security module 306, in various embodiments, is configured to transmit the generated secure short URL to, for example, a client device 104. Further, the client device 104 is configured to receive the generated secure short URL from the security module 306 and/or the host 102 and provide the secure short URL to one or more consumer devices 106 (e.g., via a "clickable" link in an email, on a social media page/post, an instant message, a text message, etc.).

Figure 3B:
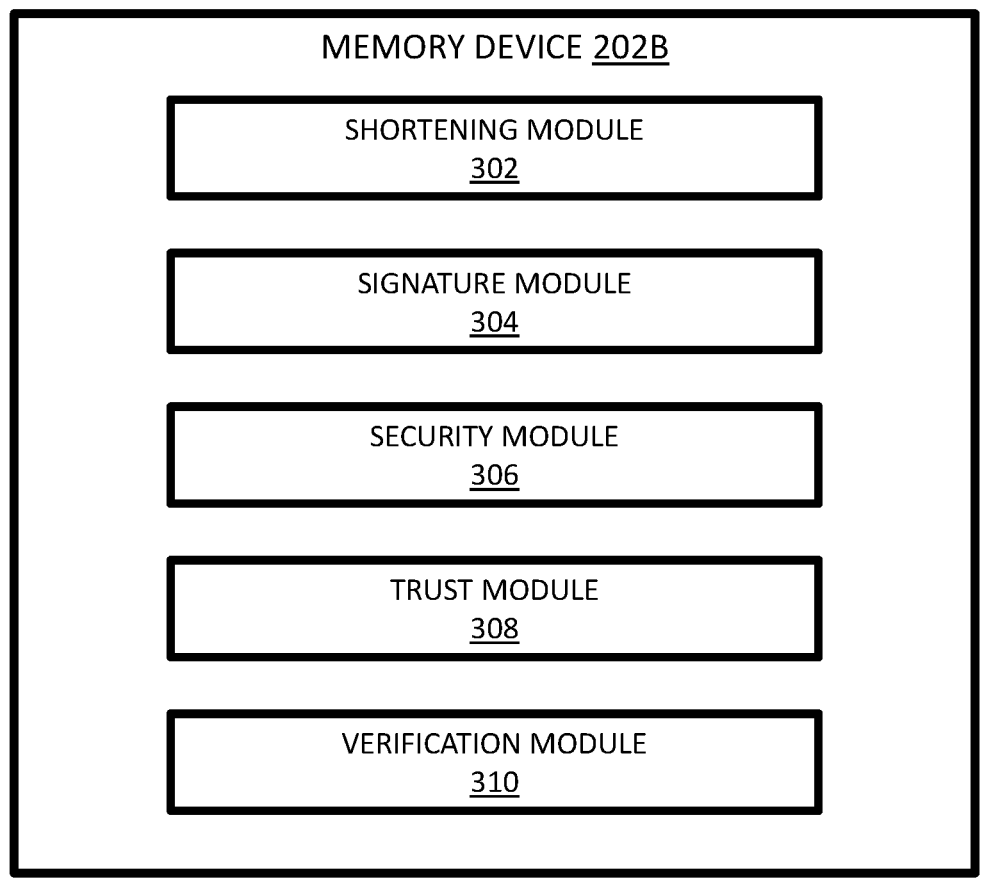

Referring now to FIG. 3B, FIG. 3B is a schematic block diagram of another embodiment of a memory device 202B. At least in the illustrated embodiment, the memory device 202B includes a shortening module 302, a signature module 304, and a security module 306 similar to the shortening module 302, signature module 304, and security module 306 included in the memory device 202A discussed with reference to FIG. 3A. At least in the illustrated embodiment, the memory device 202B further includes, among other components, a trust module 308 and a verification module 310 that are each configured to cooperatively operate/function with one another and the shortening module 302, signature module 304, and security module 306 when executed by the processor 204 to generate secure shortened URLs.

A trust module 308 may include any suitable hardware and/or software that can authenticate a user/client device 104 and/or establish a chain of trust for the user/client device 104. In various embodiments, the trust module 308 can ensure that the user/client device 104 is the actual entity/device that generated a secure short URL.

The trust module 308, in various embodiments, is configured to receive and store a valid authentication certificate from the user/client device 104, which can be any suitable authentication certificate that is known or developed in the future. In certain embodiments, the authentication certificate is a X.509 certificate, among other authentication certificates that are possible and contemplated herein.

In various embodiments, a valid X.509 certificate defines the format of a public key corresponding to the private key used by the signature module 304 to sign a shortened URL in generating the signed shortened URL. That is, the X.509 certificate configured to bind the identity of the user/client device 104 to a corresponding public key stored in the trust module 308 utilizing a digital signature. In other words, the X.509 certificate includes the identity (e.g., a hostname, an organization name, and/or an individual's name, etc.) and a public key (e.g., PKI, RSA, DSA, ECDSA, etc.), and is either signed by a certification authority (CA) or is self-signed. When a certificate is signed by a trusted CA, or validated by other means, the trust module 308 can use the public key in the X.509 certificate to establish secure communications with a us device 104 and/or validate shortened URLs digitally signed by the corresponding private key (e.g., signed shortened URLs) and utilized to eventually generate short URLs that are based thereon (e.g., secure short URLs). In this manner, the trust module 308 can verify and/or ensure that a client device 104 and or an account controlled/owed by the client device 104 has not been taken over and/or breached by an unauthorized entity and/or third-party.

A verification module 310 may include any suitable hardware and/or software that can verify the authenticity of a destination in a short URL. A verification module 310 may be configured to a verify the authenticity of a destination in a short URL using any suitable technique, method, and/or process that is known or developed in the future.

In various embodiments, the verification module 310 is configured to a verify the authenticity of a destination in a short URL in response to receiving a request from one or more computing devices (e.g., a client device 104) to access a website and/or webpage included in a short URL. The verification module 310, in various embodiments, is configured to verify and/or attest that the destination website and/or webpage is benign (e.g., free of malware, ransomware, spyware, adware, worms, trojan horses, key loggers, etc.).

To verify and/or attest that the destination website and/or webpage is benign, the verification module 310 is configured to retrieve/obtain and inspect one or more digital certificates (e.g., a Secure Sockets Layer (SSL) certificate, etc.) for the destination website and/or webpage. In some embodiments, the verification module 310 is configured to retrieve and inspect a thumbprint of the digital certificate for a destination website and/or webpage in verifying and/or attesting that the destination website and/or webpage is valid and/or benign.

A valid digital certificate and/or the thumbprint of a valid digital certificate can inform the verification module 310 that the destination website and/or webpage is valid, a legitimate website/webpage, and/or is free of malware, ransomware, spyware, adware, worms, trojan horses, key loggers, and/or the like. In additional or alternative embodiments, the verification module 310 can verify a date stamp and/or time stamp on a short URL (e.g., via a match of the date stamp and/or time stamp on a generated short URL and an actuated short URL and/or link).

In response to determining that a destination website and/or webpage is a legitimate website/webpage and/or does not include malware, ransomware, spyware, adware, worms, trojan horses, key loggers, and/or the like, the verification module 310 redirects the request to access the website/webpage to the website/webpage so that the user/client device 104 is able to access the website/webpage. In response to determining that a destination website and/or webpage is not a legitimate website/webpage and/or includes malware, ransomware, spyware, adware, worms, trojan horses, key loggers, and/or the like, the verification module 310 declines to redirect the request to access the website/webpage to the website/webpage so that the user/client device 104 is unable to access the website/webpage. In certain embodiments, the verification module 310 can inform the user/client device 104 that the request is denied because the destination website and/or webpage is not a legitimate website/webpage and/or includes malware, ransomware, spyware, adware, worms, trojan horses, key loggers, and/or the like. In this manner, the verification module 310 can further verify and/or further ensure that a client device 104 and/or an account controlled/owed by the client device 104 has not been taken over and/or breached by an unauthorized entity and/or third-party (e.g., in addition to and/or in the alternative to the trust module 308).

Referring back to FIG. 2A, a processor 204 may include any suitable non-volatile/persistent hardware and/or software configured to perform and/or facilitate performing functions and/or operations for generating secure short URLs. In various embodiments, the processor 204 includes hardware and/or software for executing instructions in one or more modules and/or applications that can perform and/or facilitate performing functions and/or operations for generating secure short URLs. The modules and/or applications executed by the processor 204 for generating secure short URLs can be stored on and executed from one or more memory devices 202 and/or from the processor 204.

Figure 4A:
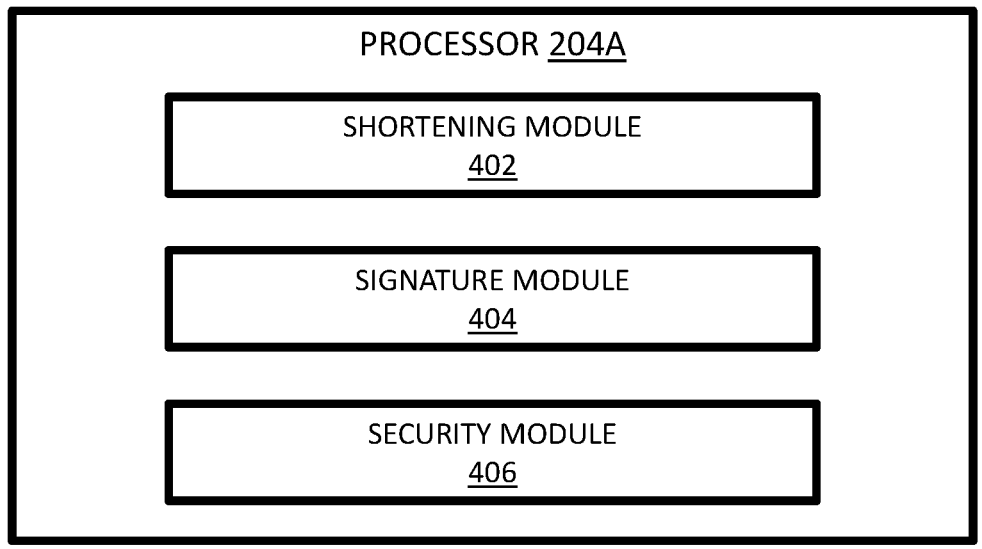
FIGS. 4A and 4B are schematic block diagrams of various embodiments of a processor included in the host computing devices of FIGS. 2A and 2B.

With reference to FIG. 4A, FIG. 4A is a schematic block diagram of one embodiment of a processor 204A. At least in the illustrated embodiment, the processor 204A includes, among other components, a shortening module 402, a signature module 404, and a security module 406 that are each configured to cooperatively operate/function with one another when executed by the processor 204A to generate secure short URLs similar to the shortening module 302, signature module 304, and security module 306 discussed with reference to the memory device 202A illustrated in FIG. 3A.

Figure 4B:
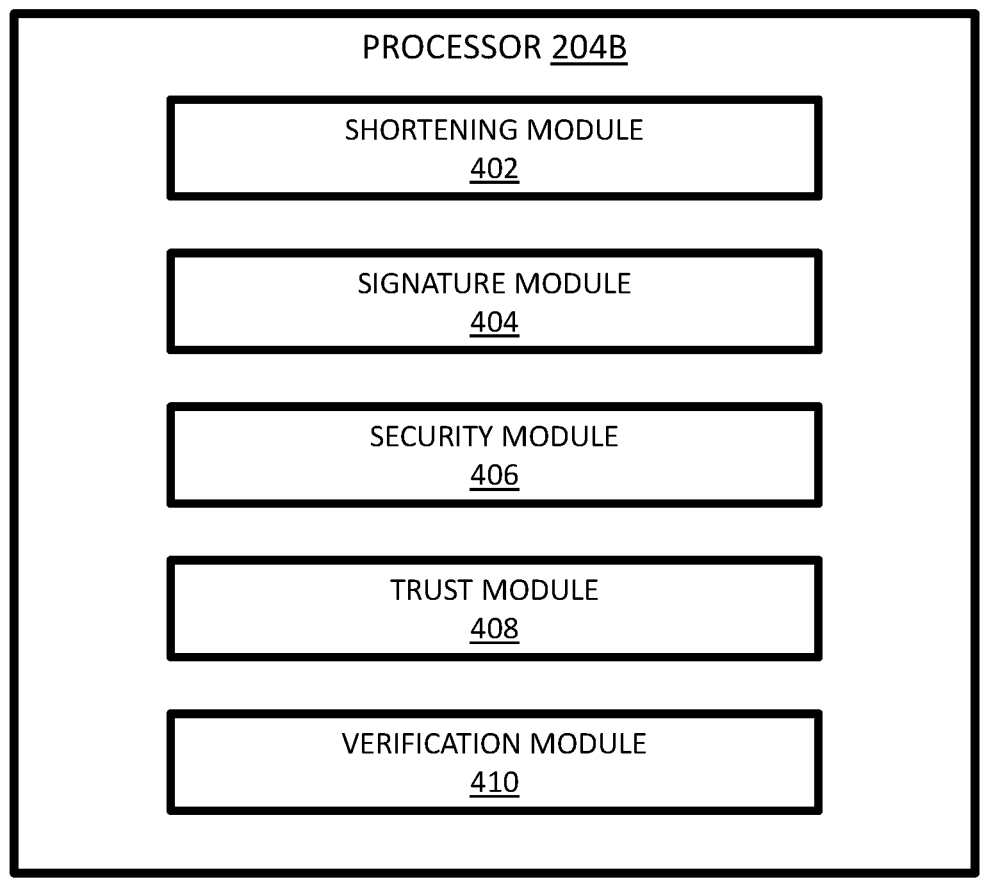

Referring to FIG. 4B, FIG. 4B is a schematic block diagram of another embodiment of a processor 204B. At least in the illustrated embodiment, the processor 204B includes, among other components, a shortening module 402, a signature module 404, a security module 406, a trust module 408, and a verification module 410 that are each configured to cooperatively operate/function with one another when executed by the processor 204B to generate secure short URLs similar to the shortening module 302, signature module 304, security module 306, trust module 308, and verification module 310 discussed with reference to the memory device 202B illustrated in FIG. 3B.

With reference again to FIG. 2A, an I/O device 206 may include any suitable I/O device that is known or developed in the future. In various embodiments, the I/O device 206 is configured to enable the host 102A to communicate with one or more external devices and/or entities (e.g., client device 104).

Figure 2B:
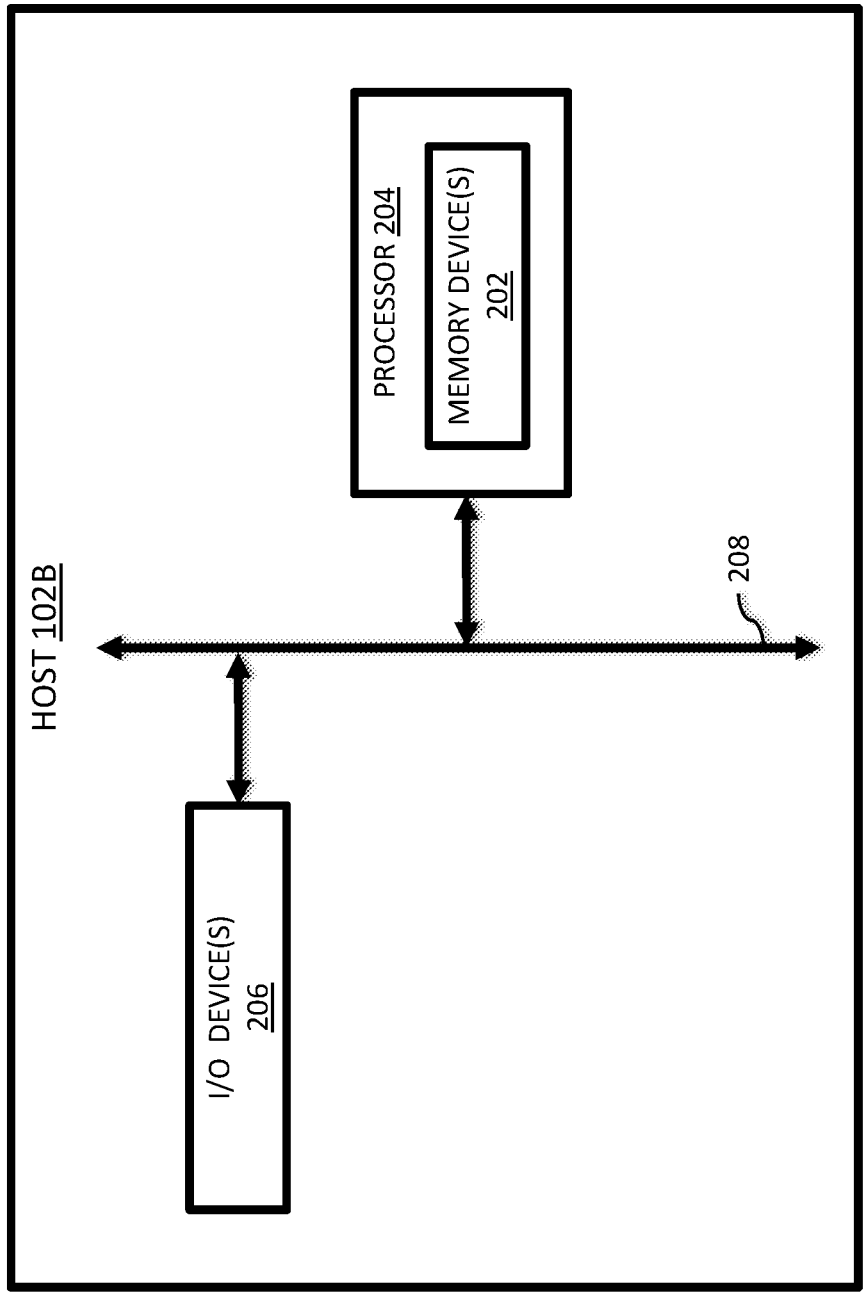

Turning now to FIG. 2B, FIG. 2B is a block diagram of another embodiment of a host 102B. The host 102B includes, among other components, one or more memory devices 202, a processor 204, and one or more I/O devices 206 similar to the host 102A discussed elsewhere herein. Alternative to the host 102A, the processor 204 in the host 102B includes the memory device(s) 202 as opposed to the memory device(s) 202 of the host 102A being a different device than and/or independent of the processor 204.

Referring back to FIG. 1, a client device 104 may include any suitable computing device that is known or developed in the future that can request a host 102 to generate a secure short URL and provide the secure short URL to one or more consumer devices 106. Examples of a client device 104 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

Figure 5A:
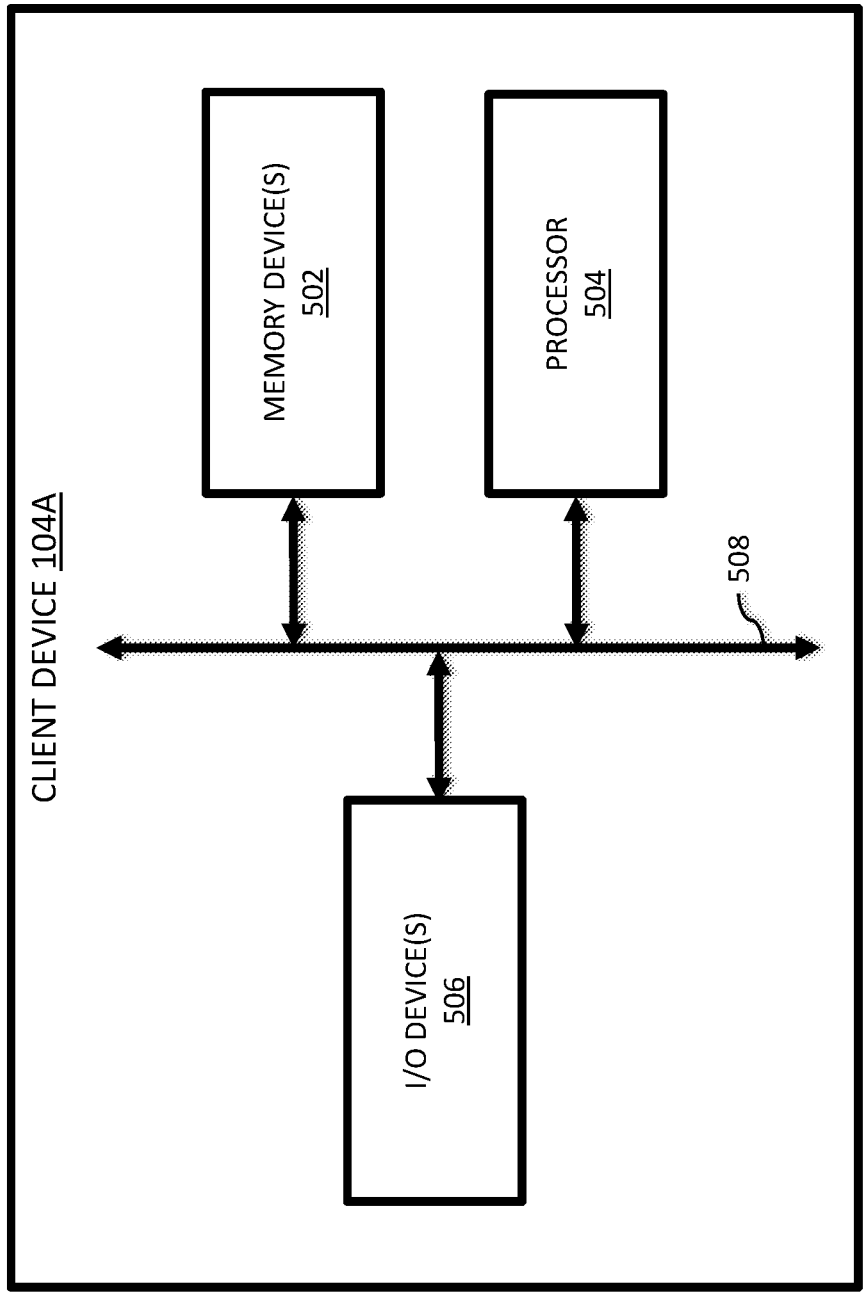
FIGS. 5A and 5B are schematic block diagrams of various embodiments of a client computing device included in the computing system of FIG. 1.

With reference to FIG. 5A, FIG. 5A is a block diagram of one embodiment of a client device 104A. At least in the illustrated embodiment, the client device 104A includes, among other components, one or more memory devices 502, a processor 504, and one or more I/O devices 506 coupled to and/or in communication with one another via a bus 508 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer-readable storage media. For example, a memory device 502 may include random-access memory (RAM), including dynamic RAM (DRAM), synchronous dynamic RAM (SDRAM), and/or static RAM (SRAM). In other embodiments, a memory device 502 may include non-volatile computer-readable storage media. For example, a memory device 502 may include a hard disk drive, a flash memory, and/or any other suitable non-volatile computer storage device that is known or developed in the future. In various embodiments, a memory device 502 includes both volatile and non-volatile computer-readable storage media.

Figure 6:
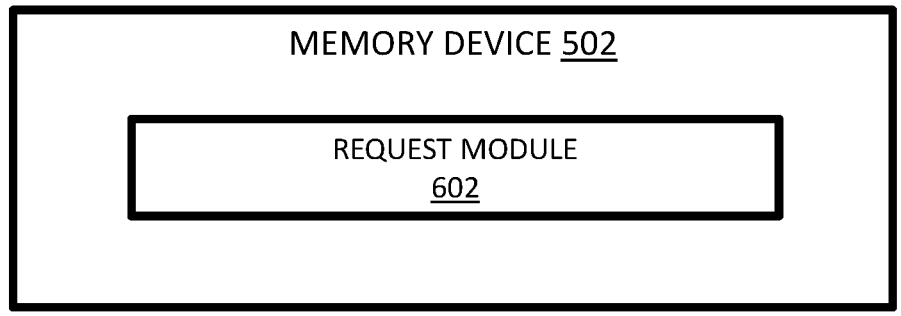
FIG. 6 is a schematic block diagrams of one embodiment of a memory device included in the client computing devices of FIGS. 5A and 5B.

With reference now to FIG. 6, FIG. 6 is a schematic block diagram of one embodiment of a memory device 502. At least in the illustrated embodiment, the memory device 502 includes, among other components, a request module 602 that is configured to operate/function when executed by the processor 504 to transmit requests to a host 102.

A diagram module 602 may include any suitable hardware and/or software that can transmit requests to a host 102. In various embodiments, the requests to the host 102 include a request to generate a secure short URL for a full-length URL.

The full-length URL included in a request generated by the request module 602 may include any suitable URL that is known or developed in the future. Further, the full-length URL included in the request may include any suitable quantity of characters utilized to direct a browser to a destination website and/or webpage. As discussed above, the host 102 can receive the requests to generate a secure short URL from the client device 104 and/or request module 602.

Referring back to FIG. 5A, a processor 504 may include any suitable non-volatile/persistent hardware and/or software configured to perform and/or facilitate performing processing functions and/or operations. In various embodiments, the processor 504 includes hardware and/or software for executing instructions in one or more modules and/or applications that can perform and/or facilitate performing functions and/or operations for requesting a host 102 to generate a secure short URL. The modules and/or applications executed by the processor 504 for requesting a host 102 to generate a secure short URL can be stored on and executed from one or more memory devices 502 and/or from the processor 504.

Figure 7:
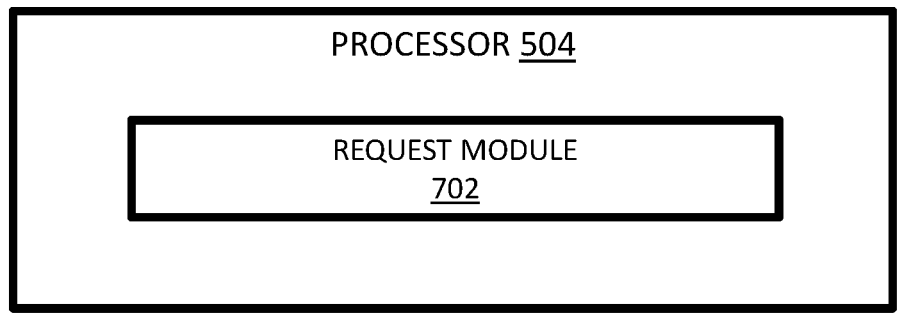
FIG. 7 is a schematic block diagram of one embodiment of a processor included in the client computing devices of FIGS. 5A and 5B.

With reference to FIG. 7, FIG. 7 is a schematic block diagram of one embodiment of a processor 504. At least in the illustrated embodiment, the processor 504 includes, among other components, a request module 702 that is configured to operate/function when executed by the processor 504 to request a host 102 to generate a secure short URL similar to the request module 602 discussed with reference to the memory device 502 illustrated in FIG. 6.

Figure 5B:
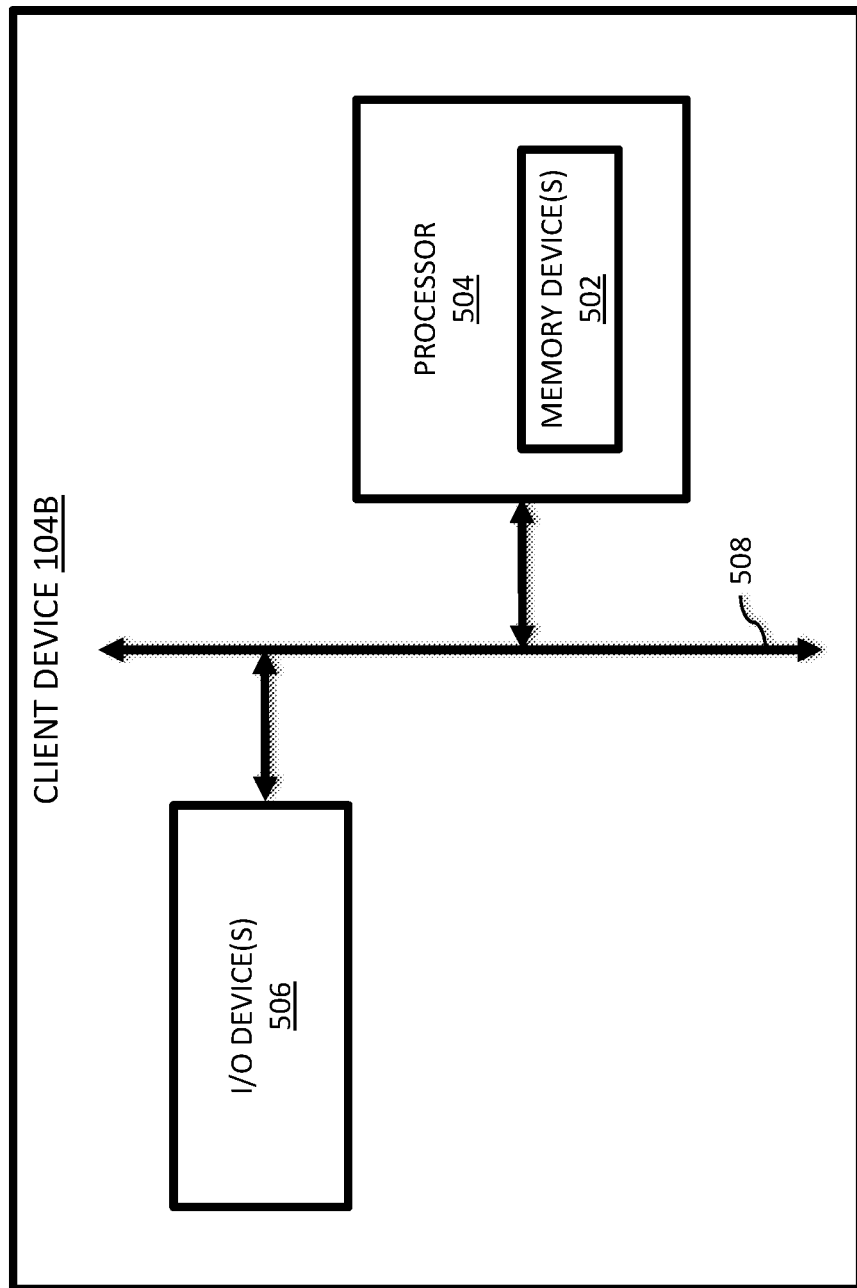

Turning now to FIG. 5B, FIG. 5B is a block diagram of another embodiment of a client device 104B. The client device 104B includes, among other components, one or more memory devices 502, a processor 504, and one or more I/O devices 506 similar to the client device 104A discussed elsewhere herein. Alternative to the client device 104A, the processor 504 in the client device 104B includes the memory device(s) 502 as opposed to the memory device(s) 502 of the client device 104A being a different device than and/or independent of the processor 504.

The I/O device(s) 506 may include any suitable I/O device that is known or developed in the future similar to the I/O device(s) 206 discussed elsewhere herein. In various embodiments, the I/O device(s) 506 can provide a secure short URL to one or more other and/or external computing devices (e.g., client device(s) 104) in the form of, for example, a link.

The client device(s) 104 can actuate (e.g., click on) the link, which directs a browser on the client device(s) 104 to the trust module 308 and verification module 310 to perform their respective operations. That is, the trust module 308 can verify that the short URL was generated from a legitimate/valid source and/or is a legitimate/valid short URL and the verification module 310 can verify that the destination website/webpage of the short URL is legitimate/valid website/webpage and/or does not include malicious software (e.g., malware, ransomware, spyware, adware, worms, trojan horses, key loggers, etc.), as respectively discussed elsewhere herein.

Referring again to FIG. 1, a consumer device 106 may include any suitable computing device that is known or developed in the future that access a website and/or website via receiving/accessing a secure short URL (e.g., via a "clickable" link in an email, on a social media page/post, an instant message, a text message, etc.) and actuating (e.g., "clicking on") the secure short URL. Examples of a consumer device 106 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

The consumer device(s) 106 may include any suitable quantity of consumer device that is greater than or equal to one (1) consumer device 106. In various embodiments, a consumer device 106 include a browser that enables the consumer device 106 to access and/or be redirected to a website/webpage in response to the consumer device 106 actuating (e.g., clicking on) the secure short URL.

A network 108 is configured to connect and/or couple a host 102, a client device 104, and one or more consumer devices 106 to one another so that the host 102, the client device 104, and the consumer device(s) 106 is/are in communication with each other. The network 108 may include any suitable wired and/or wireless network that is known or developed in the future that enables the host 102, the client device 104, and the consumer device(s) 106 to be coupled to and/or in communication with one another and/or to share resources.

In various embodiments, the network 108 may include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating and/or sharing resources with one another that are possible and contemplated herein.

Figure 8:
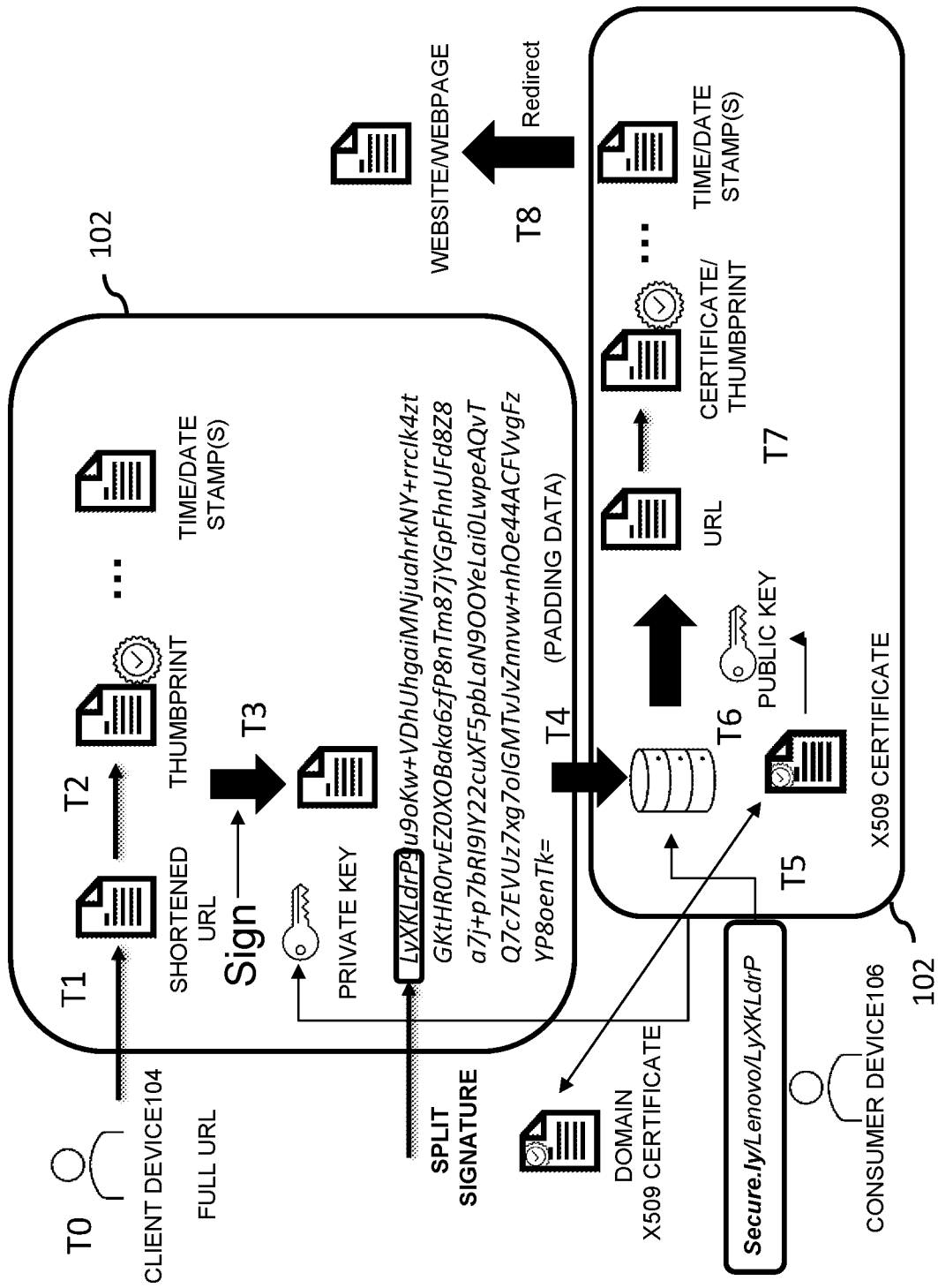
FIG. 8 is a flow diagram illustrating one example of the operations of various embodiments of the computing system of FIG. 1.

With reference to FIG. 8, FIG. 8 is a timing diagram showing a non-limiting example of the operations of the various embodiments disclosed herein. At least in the illustrated example, a client device 104 (e.g., a user) selects a full-length URL and transmits a request to a host 102 to generate a secure short URL for the selected full-length URL (time T0). At time T1, the host 102 (e.g., a shortening module 302) shortens the URL and, a time T2, generates a thumbprint for the website/webpage for the URL and optionally adds a time and/or date stamp to the shortened URL.

The host 102 (e.g., a signature module 304) signs the shortened URL via a private key, which generates a signature for the shortened URL, as discussed elsewhere herein (time T3). At time T4, the host 102 (e.g., a security module 306) combines the shortened URL and a split signature of the signature to generate a secure short URL and stores the secure short URL (e.g., in a trust module 308 (e.g., in a database)). If needed, padding data can be added to the secure short URL. Here, the secure short URL (without padding data) is, for example, secure.ly/lenovo/LyXKLdrP, as discussed elsewhere herein.

At one or more subsequent times (not shown), the host 102 provides the secure short URL to the client device 104 and the client device 104 provides the secure short URL to one or more consumer devices 106. At time T5, the consumer device(s) 106 actuate(s) (e.g., "clicks" on) the secure short URL.

In response to the actuation, the host 102 (e.g., a trust module 308) verifies the signature using a public key and/or time/date stamps, as discussed elsewhere herein (time T6). At time T7, the host 102 verifies that the destination website/webpage is legitimate and/or does not include malicious software via the certificate(s) and/or thumbprint for the website/webpage, as discussed elsewhere herein. In response to the host 102 positively verifying the short URL and the destination website/webpage, the host redirects the browser of the consumer device(s) 106 to the destination website/webpage (time T8).

Figure 9:
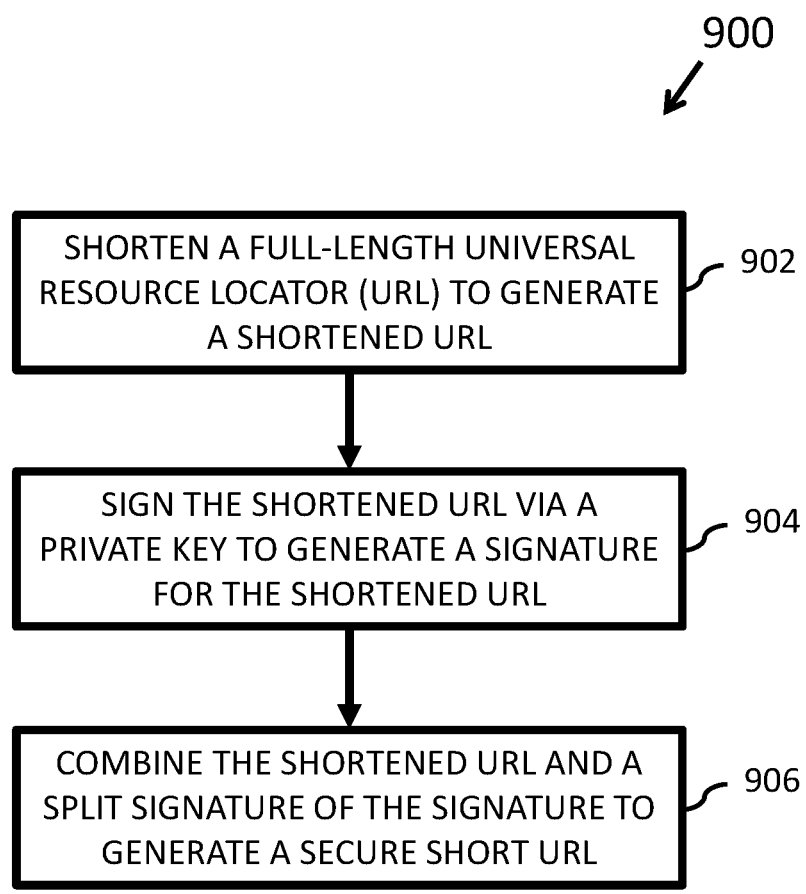
FIGS. 9 through 11 are flow diagrams of various embodiments of methods for generating secure short URLs.

FIG. 9 is a schematic flow chart diagram illustrating one embodiment of a method 900 for generating secure short URLs. At least in the illustrated embodiment, the method 900 begins by a processor (e.g., processor 204) shortening a full-length URL to generate a shortened URL (block 902). The shortened URL may include any of the attributes discussed elsewhere herein.

The method 900 further includes the processor 204 signing the shortened URL via a private key, which generates a signature for the shortened URL (block 904). The signature may include any of the attributes for a signature and/or private key discussed elsewhere herein.

The processor 204 further combines the shortened URL and a split signature of the signature to generate a secure short URL (block 906). The secure short URL and/or split signature may include any suitable length and/or quantity of characters, as discussed elsewhere herein.

Figure 10:
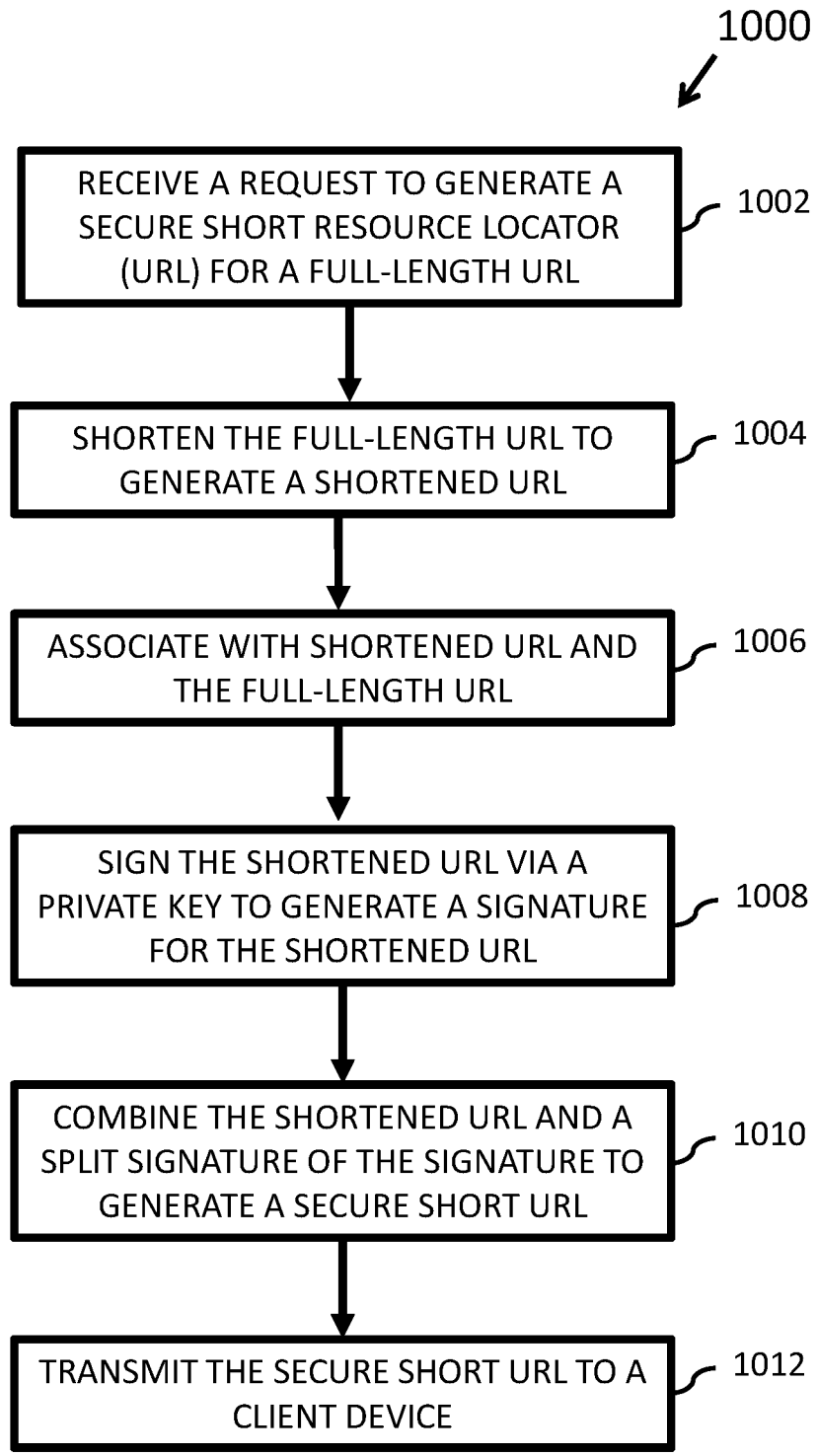

FIG. 10 is a schematic flow chart diagram illustrating another embodiment of a method 1000 for generating secure short URLs. At least in the illustrated embodiment, the method 1000 begins by a processor (e.g., processor 204) receiving a request (e.g., from a client device 104) to generate a secure short URL for a full-length URL (block 1002).

The processor 204 shortens the full-length URL to generate a shortened URL (block 1004), which may include any of the attributes for a shortened URL discussed elsewhere herein. The shortened URL and the full-length URL are associated with one another for reference and/or look-up purposes (block 1006). The shortened URL and the full-length URL may be associated for reference and/or look-up purposes in any manner, as discussed elsewhere herein.

The method 1000 further includes the processor 204 signing the shortened URL via a private key, which generates a signature for the shortened URL (block 1008). The signature may include any of the attributes for a signature and/or private key discussed elsewhere herein.

The processor 204 further combines the shortened URL and a split signature of the signature to generate a secure short URL (block 1010) and the secure short URL is transmitted to the requesting client device 108 (block 1012). The secure short URL and/or split signature may include any suitable length and/or quantity of characters, as discussed elsewhere herein.

Figure 11:
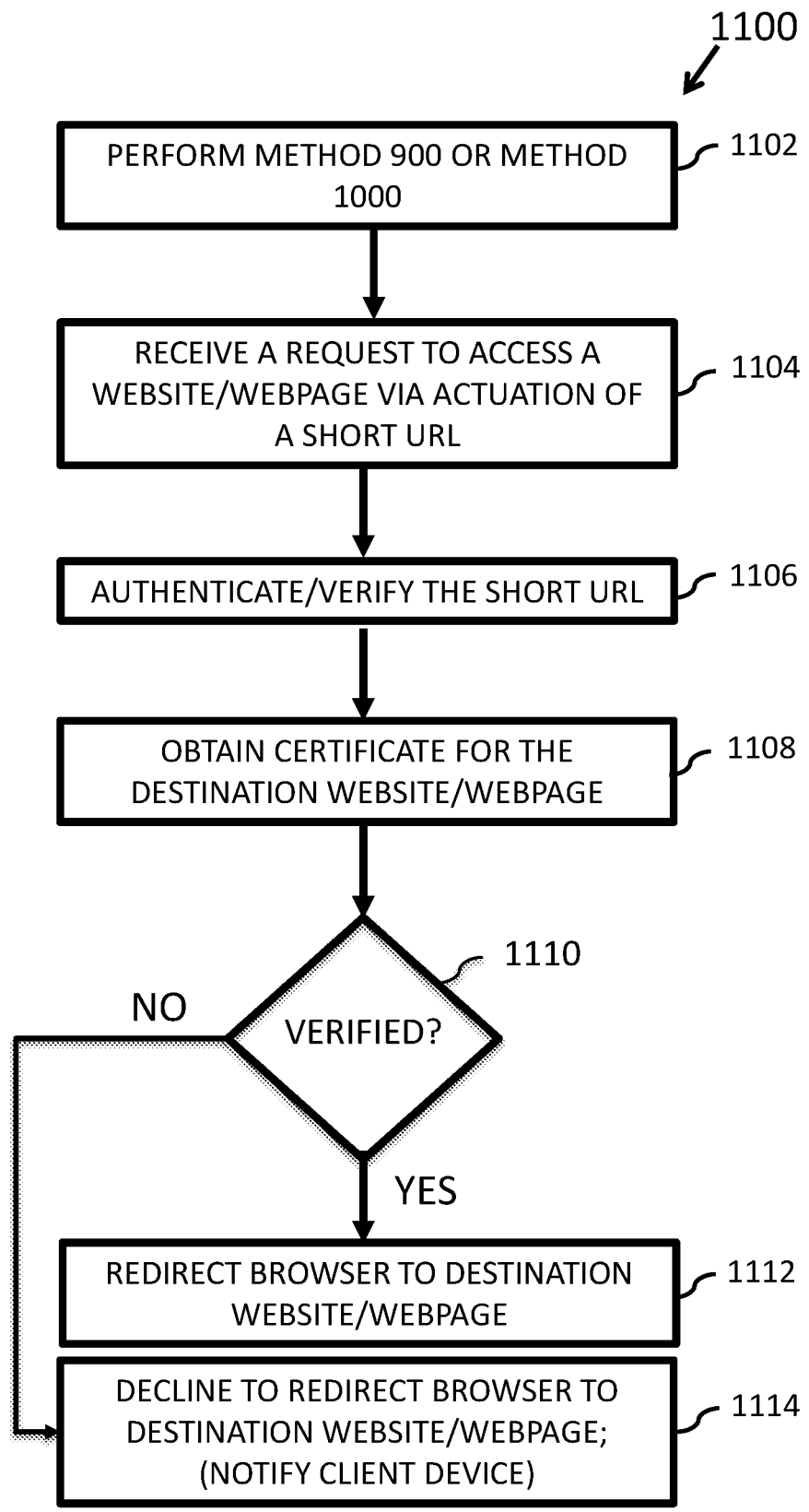

FIG. 11 is a schematic flow chart diagram illustrating still another embodiment of a method 1100 for generating secure short URLs. At least in the illustrated embodiment, the method 1100 begins by a processor (e.g., processor 204) performing the method 900 or the method 1000 (block 1102).

The processor 204 receives a request (e.g., from a client device 104) to access a website/webpage via a short URL being actuated and/or clicked on (block 1104). In response to the request/actuation, the processor verifies the short URL (block 1108). The short URL can be verified using any of the techniques and/or processes discussed elsewhere herein.

The method 1100 further includes the processor 204 obtaining (and/or retrieving) a certificate (e.g., an SSL certificate) for the destination website/webpage (block 1108). The processor 204 can verify whether the destination website/webpage is legitimate/illegitimate and/or includes malicious software based on the obtained certificate (block 1110).

In response to the destination website/webpage being verified (e.g., a "YES" in block 1110), the processor directs the browser of the client device 104 to the destination website/webpage (block 1112). In response to the destination website/webpage not being verified (e.g., a "NO" in block 1110), the processor declines to direct the browser of the client device 104 to the destination website/webpage (block 1114) and may notify the client device 104 that the destination website/webpage is illegitimate and/or includes malicious software.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
shorten a Universal Resource Locator (URL) for a website,
sign the shortened URL via a private key to generate a signature for the shortened URL,
combine the shortened URL with a split signature of the signature to generate a secure short URL for the website,
obtain a thumbprint of a URL certificate for the website,
receive a command to access a particular website via the shortened URL,
verify whether the particular website in the received command is the website for the shortened URL via the thumbprint, and
redirect the received command to the website in response to the thumbprint verifying the particular website in the received command is the website for the shortened URL.

2. The apparatus of claim 1, wherein the split signature comprises a subset of the signature.

3. The apparatus of claim 1, wherein the code further causes the processor to:
receive a request from a client device to shorten the URL;
associate the short URL and the URL; and
transmit the short URL to the client device,
wherein the shortening, signing, and combining are performed in response to receiving the request.

4. The apparatus of claim 3, wherein:
the private key is associated the client device; and
the code further causes the processor to authenticate the short URL via a public key corresponding to the private key that signed the shortened URL.

5. The apparatus of claim 1, wherein the code further causes the processor to:
decline to redirect the received command to the website in response to the thumbprint failing to verify the particular website in the received command is the website for the shortened URL; and
notify the client device that the thumbprint failed to verify the particular website.

6. The apparatus of claim 1, wherein the private key is associated with one of:
a Public Key Infrastructure (PKI) encryption protocol;
a Rivest-Shamir-Adleman (RSA) encryption protocol;
a Digital Signature Algorithm (DSA); and
an Elliptic Curve Digital Signature Algorithm (ECDSA) encryption protocol.

7. The apparatus of claim 1, wherein the private key is associated with the PKI encryption protocol.

8. A method, comprising:
shortening, by a processor, a Universal Resource Locator (URL) for a website;

signing the shortened URL via a private key to generate a signature for the shortened URL;

combining the shortened URL with a split signature of the signature to generate a secure short URL for the web site;

obtaining a thumbprint of a URL certificate for the website;

receiving a command to access a particular website via the shortened URL;

verifying whether the particular website in the received command is the website for the shortened URL via the thumbprint; and redirecting the received command to the website in response to the thumbprint verifying the particular website in the received command is the website for the shortened URL.

9. The method of claim 8, wherein the split signature comprises a subset of the signature.

10. The method of claim 8, further comprising:
receiving a request from a client device to shorten the URL;
associating the short URL and the URL; and
transmitting the short URL to the client device,
wherein the shortening, signing, and combining are performed in response to receiving the request.

11. The method of claim 10, wherein:
the private key is associated the client device; and
the method further comprises authenticating the short URL via a public key corresponding to the private key that signed the shortened URL.

12. The method of claim 8, further comprising:
declining to redirect the received command to the website in response to the thumbprint failing to verify the particular website in the received command is the website for the shortened URL; and
notifying the client device that the thumbprint failed to verify the particular website.

13. The method of claim 8, wherein the private key is associated with one of:
a Public Key Infrastructure (PKI) encryption protocol;
a Rivest-Shamir-Adleman (RSA) encryption protocol;
a Digital Signature Algorithm (DSA); and
an Elliptic Curve Digital Signature Algorithm (ECDSA) encryption protocol.

14. A computer program product comprising a computer-readable storage device including code embodied therewith, the code executable by a processor to cause the processor to:
shorten a Universal Resource Locator (URL) for a web site;
sign the shortened URL via a private key to generate a signature for the shortened URL;
combine the shortened URL with a split signature of the signature to generate a secure short URL for the website;
obtain a thumbprint of a URL certificate for the web site;
receive a command to access a particular website via the shortened URL;
verify whether the particular website in the received command is the website for the shortened URL via the thumbprint; and
redirect the received command to the web site in response to the thumbprint verifying the particular website in the received command is the website for the shortened URL.

15. The computer program product of claim 14, wherein the split signature comprises a subset of the signature.

16. The computer program product of claim 14, wherein the code further causes the processor to:
receive a request from a client device to shorten the URL;
associate the short URL and the URL; and
transmit the short URL to the client device,
wherein the shortening, signing, and combining are performed in response to receiving the request.

17. The computer program product of claim 16, wherein:
the private key is associated the client device; and
the code further causes the processor to authenticate the short URL via a public key corresponding to the private key that signed the shortened URL.

18. The computer program product of claim 17, wherein the code further causes the processor to:
decline to redirect the received command to the website in response to the thumbprint failing to verify the particular website in the received command is the website for the shortened URL.

19. The computer program product of claim 18, wherein the code further causes the processor to:
notify the client device that the thumbprint failed to verify the particular website.

20. The computer program product of claim 14, wherein the private key is associated with one of:
a Public Key Infrastructure (PKI) encryption protocol;
a Rivest-Shamir-Adleman (RSA) encryption protocol;
a Digital Signature Algorithm (DSA); and
an Elliptic Curve Digital Signature Algorithm (ECDSA) encryption protocol.

* * * * *